US008711743B2

(12) United States Patent
De Poorter et al.

(10) Patent No.: US 8,711,743 B2
(45) Date of Patent: Apr. 29, 2014

(54) NODE AND WIRELESS SENSOR NETWORK COMPRISING THE NODE

(75) Inventors: Eli De Poorter, Ghent (BE); Ingrid Alice Robert Moerman, Nazareth (BE)

(73) Assignees: Iminds VZW, Ledeberg (Ghent) (BE); Universiteit Gent, Ghent (BE)

(*) Notice: Subject to any disclaimer, the term of this patent is extended or adjusted under 35 U.S.C. 154(b) by 236 days.

(21) Appl. No.: 12/817,722

(22) Filed: Jun. 17, 2010

(65) Prior Publication Data

US 2011/0310779 A1    Dec. 22, 2011

(51) Int. Cl.
*H04B 7/00* (2006.01)
*H04W 4/00* (2009.01)
*H04J 3/00* (2006.01)

(52) U.S. Cl.
USPC ............................ 370/310; 370/329; 370/464

(58) Field of Classification Search
None
See application file for complete search history.

(56) References Cited

U.S. PATENT DOCUMENTS

| 2005/0180429 | A1 | 8/2005 | Ghahremani et al. | |
| 2006/0123079 | A1* | 6/2006 | Sturniolo et al. | 709/203 |
| 2006/0221929 | A1 | 10/2006 | Le Moigne et al. | |
| 2007/0239862 | A1* | 10/2007 | Bronez et al. | 709/223 |
| 2012/0051272 | A1* | 3/2012 | Jain et al. | 370/310 |

FOREIGN PATENT DOCUMENTS

WO    2007130004 A2    11/2007

OTHER PUBLICATIONS

Troubleyn et al., Adaptive Modular QoS Architecture for Wireless Sensor Networks, Aug. 2008, SENSORCOMM 2008, all pages.*
De Poorter et al., "Broadening the Concept of Aggregation in Wireless Sensor Networks", published in Sensor Technologies and Applications, 2008, SENSORCOMM '08, Second International Conference on 25-31, Aug. 2008, Cap Esterel, France, ISBN: 978-0-7695-3330-8, pp. 419-428.
De Poorter et al., "An Information Driven Sensornet Architecture", Ghent University - IBBT, Dept. of Information Technology, Ghent, Belgium, Jun. 18, 2009.
Declaration of Ingrid Moerman, Aug. 18, 2010.
Declaration of Eli De Poorter, Aug. 18, 2010.
Declaration of Piet Demeester, Aug. 18, 2010.

* cited by examiner

*Primary Examiner* — Chirag Shah
*Assistant Examiner* — Srinivasa Reddivalam
(74) *Attorney, Agent, or Firm* — Workman Nydegger

(57) ABSTRACT

A node (100) according to the invention is able to generate or receive, process and transmit information (161). At runtime, the node (100) dynamically determines and activates the protocols for processing the generated or received information (161).

21 Claims, 3 Drawing Sheets

NODE AND WIRELESS SENSOR NETWORK COMPRISING THE NODE

FIELD OF THE INVENTION

The present invention generally relates to the handling of information that is locally generated in or received by network nodes. The invention in particular concerns the handling of information in networks with embedded devices, i.e. devices that have limited processing and memory resources. These embedded devices are typically battery-operated and heterogeneous in terms of information packaging and protocol stack. In wireless sensor networks or WSNs for instance, small battery-operated sensors collect information through monitoring and sensing, and transmit the encapsulated information to network nodes with more extensive processing and storage capabilities. The current invention however can advantageously be used in a broader range of applications and networks, e.g. in geo-routing, in wireless building automation or WBA, in access control, in medical monitoring, in monitoring industrial processes, in any type of local area network or access network, in particular in co-located wired and wireless networks.

BACKGROUND OF THE INVENTION

Lots of applications use a network of small, rather cheap, battery-operated sensor devices, such as fire detectors, occupation sensors, movement sensors, temperature sensors, humidity sensors, light intensity sensors, etc. These sensors, or more generally embedded devices, generate information or receive, process and transmit information encapsulated in packets to network nodes with more extensive processing capabilities. The latter nodes may be rather simple, e.g. light switches, or may be more complex, e.g. heating controllers.

Since embedded devices such as sensors are usually battery-operated, passed efforts have been focusing on reducing the energy consumption. In the article "*Broadening the Concept of Aggregation in Wireless Sensor Networks*", the authors Eli De Poorter, Stefaan Bouckaert, Ingrid Moerman and Piet Demeester for instance propose global aggregation, i.e. combining information from different sources, different network layers and different protocols into a single information packet, in order to reduce the overall amount of transmissions in wireless sensor networks thereby increasing the energy efficiency and network lifetime.

Although Eli De Poorter et al. suggest protocol and layer independent aggregation, excessive memory and processing resources are still consumed in each network node for handling the information packets as a result of the redundancy in overhead introduced at different layers of the protocol stacks.

International Patent Application WO 2007/130004 entitled "Smart Data Dissemination" addresses the problem of heterogeneous data formats and transport mechanisms in networks with large amounts of inexpensive, energy-constrained sensor devices. WO 2007/130004 therefore proposes a wireless sensor network wherein each wireless network node maintains a set of XML configurable, predetermined rules that define the processing of received data based on data characteristics, network conditions and device conditions. This way, different nodes in the WSN can handle a single data packet differently, i.e. optimally process the data packet depending on network, traffic and device conditions.

Although WO 2007/130004 enables different processing in various nodes, e.g. unicast vs. broadcast, data compression or fusion, etc., taking into account the measured or actual traffic and network conditions, it does not cope with the heterogeneity in protocols, network layers and data formats, and certainly does not ensure always optimal connectivity and protocol independent quality of service.

U.S. patent application US 2006/0221929 entitled "Description of Packet in a Packet Communication Network" describes a router that maintains or has access to a database of data descriptors, 21 in FIG. 2 of US 2006/0221929. Upon receipt of a data packet, the router processes the packet as a function of the data descriptor, independent of the protocol. The data descriptors are sent to the router via separate packets or via a signalling channel. Each received data packet further contains an identifier of the relevant data descriptor in the database.

Although the router known from US 2006/0221929 receives protocol independent information on the type of data, source and addressee, enabling to apply dedicated processing, the underlying network technology remains IP (Internet Protocol). The technique described in US 2006/0221929 requires a standardized way to communicate data descriptors in IP packets or over a signalling channel, is therefore not backwards compatible, and at best enables an IP router to make abstraction of the layer 4 to 7 protocols. In other words, US 2006/0221929 does not tackle the heterogeneity in protocols and formats at layers 1-3, and does not guarantee an always-optimal connectivity, including network-to-network connectivity. Moreover, the data descriptors known from US 2006/00221929 describe a method that has to be used to process the data. Protocol specific information like for instance a hop count value is not described by and cannot be updated using the data descriptors.

U.S. patent application US 2005/0180429 entitled "Multi-Service Network Switch with Independent Protocol Stack Architecture" describes dynamic bonding of layer two protocols to physical interfaces at runtime in a smart switch. The smart switch identifies the layer two protocols from the connection request and thereupon configures the bonding to the physical interfaces. This way, layer two protocols become independent of the physical interface they are running on.

Just like the above listed prior art solutions, US 2005/0180429 fails to provide an answer to the heterogeneity of data formats and protocols at the different network layers. It cannot connect any network technology to any other network technology thereby ensuring an always optimal connectivity.

It is an objective of the current invention to disclose a node for generating or receiving, processing and transmitting information that overcomes the above mentioned shortcomings of prior art solutions. In particular, it is an objective to disclose such node that takes into account the heterogeneity of information formats, network layers and protocols used in the network, and that supports energy-efficiency and protocol independent quality of service (QoS). It is a further objective to support an always optimally connected strategy at all network levels. It is yet another objective to disclose a node and architecture that can connect any network technology with any other network technology, supporting next generation applications for e.g. wireless sensor networks while remaining backwards compatible with existing protocol stacks and legacy networks. It is also an objective to further increase the throughput and network lifetime.

SUMMARY OF THE INVENTION

According to the current invention, the above mentioned objectives are realized through a node able to generate or receive, process and transmit information, the node being adapted to dynamically determine and activate at runtime one or more protocols for processing generated or received information.

Thus, according to the invention, information generated locally or information received, is processed using a protocol stack that is dynamically configured at runtime in each node. As a result, the protocols used to process certain information may change from node to node. The information may be encapsulated in an existing format, e.g. IP packets or ATM cells, or may be serial data, e.g. unformatted locally generated signaling data. It is noticed that the term protocol within the meaning of the current invention covers both traditional protocols like for instance existing for the different OSI layers, as well as network services, e.g. link monitoring, topology control or synchronization. Thanks to the current invention, the architecture becomes information driven. Incoming information is automatically interpreted, translated and/or converted, transparent for the network protocols. Depending on the destination network, the optimal network protocols are automatically executed. As a result, the current invention facilitates communication between any co-located networks, independent of the used radio or physical layer type, packet type or network protocols. Further, runtime addition of new services and network protocols, omitting or updating of network protocols is supported when e.g. required by higher layer applications.

Optionally, the node according to the invention comprises information interaction specification means adapted to specify the interaction with the generated or received information.

Thus, preferably a separate entity is responsible for interaction between the protocols and the generated or received information. Protocols do not know how information is structured but can add and read information attributes. By using an intermediate entity for adding or reading information attributes, the information structure can be changed without any changes to the protocol logic. In other words, information structure and protocol logic become completely decoupled.

Further optionally, the information interaction specification means may comprise an information facade containing information descriptors for each type of information, the information facade being adapted to interpret content of the generated or received information based on the information descriptors.

Thus interaction between the protocols and information may be implemented through an information facade, e.g. a packet facade, containing descriptors for all types of packets. Using these descriptors, the content and all control information associated with a received or generated packet can be interpreted automatically regardless of the used header structures and packet types. In addition, the most optimal protocol stack for processing the packet can be activated thereby transparently guaranteeing an always optimal connected strategy at all network levels.

According to another optional aspect of the node according to the present invention, the information facade is further adapted to generate a protocol independent information container.

Thus, the information facade in the node according to the invention can generate a protocol independent packet.

Still optionally, the protocol independent information container may contain generated or received information of plural protocols and/or network layers having the same destination or next hop information attribute.

This way, by automatically combining multiple information exchanges from different network layers in a single container, e.g. a protocol independent packet, global aggregation is realized with advantages similar to those described in the above cited article "Broadening the Concept of Aggregation in Wireless Sensor Networks", which is incorporated herein by reference.

According to a further optional aspect, the node according to the invention may comprise a single queue for protocol independent storage of the generated or received information.

This way, a single, system-wide queue is used to store all information. As a result thereof, protocols are no longer responsible for queue management and the redundancy of responsibilities and functions that are today implemented in the different protocols is further reduced.

According to yet another optional aspect, the node according to the invention may comprise queue management means for quality of service based handling of information stored in the queue.

Thus, a separate QoS module may be responsible for selecting the information that will be handled, i.e. dropped, scheduled, processed, etc., this way providing system-wide and protocol independent quality of service.

Also optionally, the node according to the invention may comprise means for plug-in and selection of a protocol.

Network protocols in other words reside as services on the node according to the current invention. Network protocols can be added or omitted dynamically depending on the needs of the network. When required by higher level applications, network protocols can be added or updated at runtime. As a consequence, new network services can be plugged in whenever required, resulting in an upgrade of the management path. A node according to the present invention can be made backwards compatible with any existing network by plugging in the appropriate network services and can support next generation applications that require advanced network services. In addition, a protocol selector shall be responsible for selecting the most optimal network protocol depending on the received or generated information's attributes. The order wherein the network services are executed may for instance be determined by the OSI protocol sequence, or alternatively may be determined at runtime.

According to an optional implementation, the means for plug-in and selection of a protocol may comprise:
  memory for storage of protocol rules that specify when the protocol can be used; and
  means adapted to select the one or more protocols for processing the generated or received information based on the protocol rules.

In other words, the plug-in of protocols and the selection of a protocol stack for processing the received or generated information may be rule-based.

The means for plug-in and selection of a protocol may further be adapted to count for each protocol in the memory an amount of the protocol rules that is satisfied by the generated or received information, and may select the one or more protocols for processing the generated or received information as the one or more protocols with highest amount of satisfied protocol rules.

Thus, the most straightforward implementation of rule-based protocol plug-ins and rule-based selection of the protocol stack for processing information, counts the number of rules that is satisfied for each protocol. As a result, the protocols become ranked, and the highest ranked protocol(s) shall be selected for processing the received or generated information. Obviously, several variants may be thought of. Rules for instance may be assigned weights, and the weighted sum of satisfied rules may determine the ranking of a protocol.

The node according to the current invention may further comprise an information container converter adapted to convert an information container thereby removing overhead of plural protocols and/or layers from the information container using the information descriptors.

Thus, in an embodiment of the current invention, packets may be converted with replacement of the headers at all protocol layers. This feature will be advantageous in heterogeneous networks, e.g. WiFi to LAN, where the packet characteristics defined in the packet facade will be used for the conversion. The conversion may be executed automatically based on certain information attributes like the next hop or destination attribute. Alternatively, a rule based database may describe when conversion between information containers is required.

The node according to the invention may further comprise means adapted to associate plural communication interfaces of the network node with a single Medium Access Control or MAC protocol.

This feature is also advantageous in case of heterogeneous networks where for instance two or more sensor nodes communicate via a first interface with a first network and via a second interface with a second network.

In addition to a node, the present invention also relates to a wireless sensor network, comprising one or more of the nodes described herein.

Further, the current invention also relates to a corresponding method to generate or receive, process and transmit information in a node, the method comprising dynamically determining and activating at runtime one or more protocols for processing generated or received information.

DETAILED DESCRIPTION OF EMBODIMENT(S)

Figure 1:
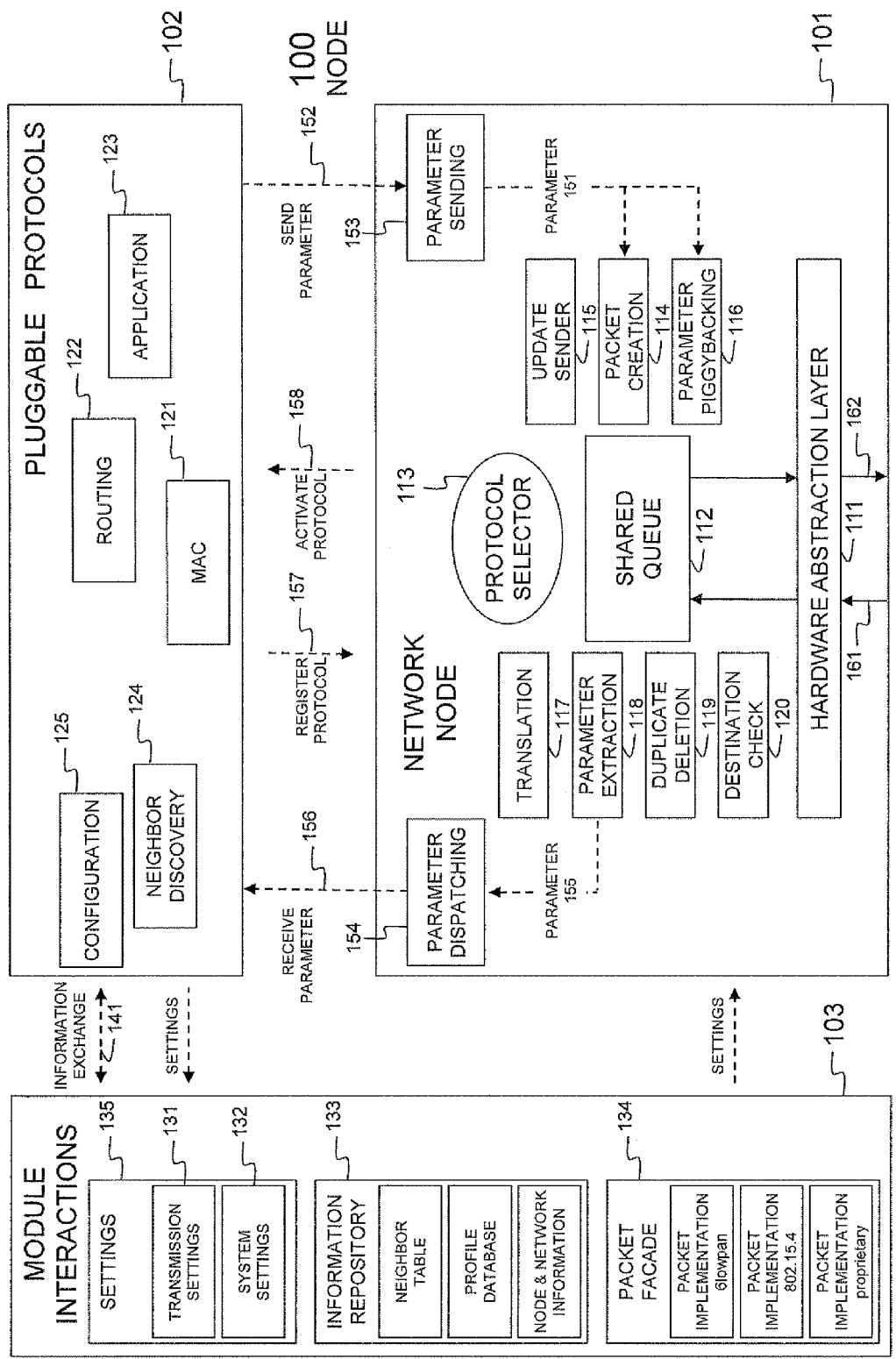
FIG. 1 illustrates an embodiment of the node 100 according to the present invention in an information driven sensor network architecture.

FIG. 1 shows an information driven architecture for a node 100 of a wireless sensor network. The architecture of node 100 is designed to support next generation wireless sensor network applications, takes into account the heterogeneity of the sensor nodes and supports energy efficiency and quality of service (QoS) at architectural level. As will be explained below, the architecture of node 100 can be made fully compatible with existing legacy sensor networks. The information driven architecture of node 100 contains network node 101, pluggable protocols 102 and module interactions 103.

The network node 101 includes preprocessing and postprocessing facilities, which support sender updating 115, duplicate detection 119, destination checking 120, extracting encapsulated parameters 118 and translating 117 between different packet types. FIG. 1 further shows the hardware abstraction layer 111 or physical layer, shared queue 112, protocol selector 113, parameter sending module 153 and parameter dispatching module 154 of network node 101.

The role of a network protocol 102, e.g. a MAC protocol 121, a routing protocol 122, an application layer protocol 123, a neighbor discovery service 124 or a configuration service 125, is simplified to its two main tasks: exchanging information as is indicated by arrow 141 and interacting with the relayed information upon activation as is indicated by arrow 158. Packet creation 114 and buffer provisioning 112 are delegated to the node 101. Thus, network protocols 102 will be simpler and require less memory.

Through the module interactions 103, the node 101 offers several system libraries to the network protocols 102. The following libraries are available:

Transmission Settings 131, as part of the Settings 135: through this interface, protocols 102 manage the sending of packets. This interface has provisions for requesting how many packets from the shared queue 112 are ready to be sent, ordering the node 101 to send a specific packet, and changing the radio settings.

System Settings 132, as part of the Settings 135: through this interface, modules change or read node settings, such as the node ID or the current battery voltage.

Information Repository 133: through this interface, the protocols 102 can distribute information parameters to other nodes, and receive information parameters from other nodes, e.g. a neighbor table, profiles, node and network information. The node 101 will convert the information parameters into a packet.

Packet Facades 134: the packet facade is used to interact with system-created packets. Information attributes can be added or read.

Protocol Selector 113: protocols 102 can add filters to this component to indicate for which packet types the respective protocols are optimized.

The information driven architecture of node 100 strongly benefits from an approach that standardizes both the information parameters, and the information attributes that are associated with exchanged information. An information parameter represents information that is exchanged between protocols or applications on different nodes. Information parameters are often of interest to several protocols, like for instance the remaining energy of neighboring nodes. When an existing, standardized information parameter is added to the waiting space of the system, the corresponding value is updated. The information parameter needs to be sent only once, rather than once for every interested protocol.

When a network protocol 102 requires an information exchange 141 with a remote node, the protocol 102 hands over an information parameter 151 to the node according to the invention 101, together with the required destination. In FIG. 1, this is indicated by the arrow 152 and functional block 153. The node 101 will ensure that the parameter 151 is encapsulated into a packet by the packet creation module 114.

Thanks to the packet creation functionality 114, the node 101 can ensure that redundant control information is sent only once, avoids that protocols 102 need to implement memory operations for manipulating header fields, and reduces the number of packet transmissions drastically by combining multiple information parameters into a single packet.

Typically, the exchanged information parameter 151 will be a measured data value like for instance the local temperature, a status update value like for instance the remaining battery capacity of a remote sensor node, or control information such as a route-request.

The network protocols 102 notify the node 101 of the type of parameters they are interested in. Whenever a packet arrives at its final destination, the parameter extraction module in node 101 extracts the information parameters 155 from the packet, thereto using the packet facade 134, and the parameter dispatching function 154 distributes them to the interested protocols 102. This is indicated by arrow 156 in FIG. 1. A protocol can also subscribe to system or link information such as the received signal strength indicator or RSSI of arriving packets.

An information attribute represents packet-associated information that is required to route a packet to its destination. Typical examples are a next-hop or a time-to-live attribute. Standardizing information attributes ensures that they can be read by all network protocols 102, and that the node 101 is aware of the properties of each packet.

Figure 2:
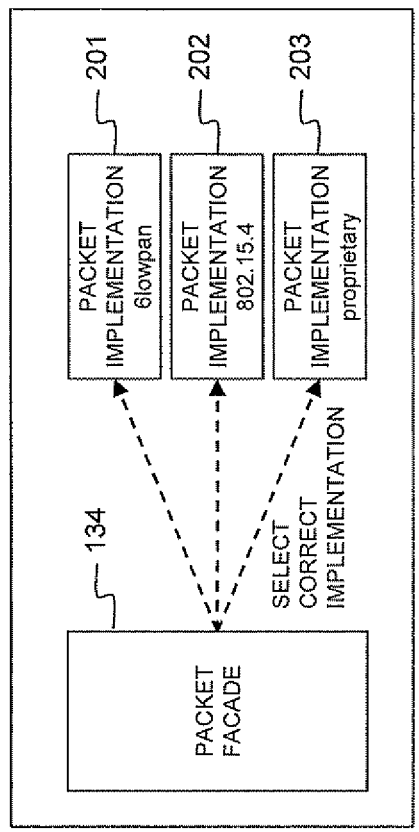
FIG. 2 illustrates operation of a packet facade in the embodiment of FIG. 1.
Figure 2:
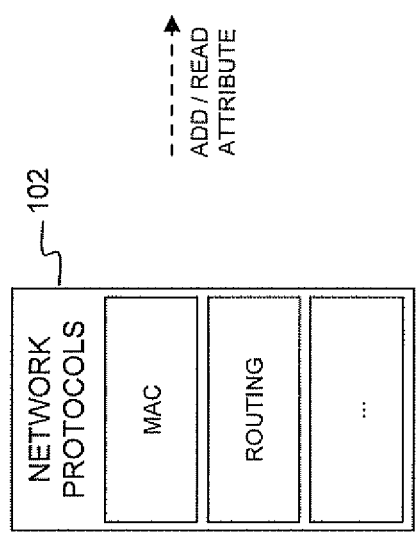

In the information driven architecture of node 100 of FIG. 1, a packet facade 134 is responsible for packet creation 114. This packet facade 134 is shown in more detail in FIG. 2. To create a packet, the node 101 calls a packet creation function of this facade 134, which creates a standardized packet to store the information parameter 151. The same packet facade 134 is used by network protocols 102 to interact with relayed packets. Protocols 102 add or retrieve information attributes, such as source, destination, QoS ID or time-to-live. These attributes fulfill the same role as traditional header fields, but are more dynamic: they can be omitted or added freely without redefining the packet structure. Moreover, information attributes have a system-wide significance. They can be inspected by the node 101 or any other protocol.

The packet facade 134 uses a separate packet implementation module, e.g. 6lowpan module 201, IEEE 802.15.4 module 202 or a proprietary module 203, to convert the control parameters into an actual radio packet. Thus, the node 101 and the protocols 102 do not need to worry about the actual storage of the information attributes. Developers can choose to use an existing packet implementation module or provide their own propriety packet implementation module. This way, the packet type can be changed without any changes to the node 101 or the protocols 102. In other words, protocol logic and packet representation are decoupled.

Using a separate packet facade 134 for packet creation simplifies protocol development since there is no longer a need to define headers. In addition, control parameters gain a system-wide significance and can be inspected by any protocol or architecture. Since protocols are no longer tied to a specific packet implementation, the encompassing packet type can easily be changed or optimized, e.g. 6lowpan, IEEE 802.15.4 or a custom packet.

In the information driven architecture of node 100 of FIG. 1, incoming packets 161 are stored in a shared queue 112, i.e. a system-wide queue that stores all information irrespective of the source, network layer or protocol. The node 101 selects which packets are ready for processing by a network protocol, and protocol selector 113 determines the protocols that can process the packets. The medium access control or MAC protocol 121 remains in control of sleeping schemes and accurate timing of the sending. The MAC protocol 121 can at any time request which packets are ready for sending, and order the node 101 to send a specific packet. The use of a shared, system-managed queue 112 has several advantages: protocols 102 are simpler and smaller since they do not have to allocate queue memory, packets do not need to be copied between protocols resulting in less processing overhead, a smaller overall queue memory is required since the queue occupation from all protocols is averaged, and monitoring and managing the total number of packets in the system has become simpler.

In the information driven architecture of FIG. 1, the protocol selector 113 of node 101 decides at run-time which protocols will be selected to process incoming packets 161. To be selected for packet processing, a protocol 102 must register itself by adding filters to the node 101. This is indicated by arrow 157 in FIG. 1. These filters indicate for which packet types the protocol is optimized. Through the packet facade 134, the node 101 checks if the arriving packets 161 contain a packet attribute corresponding to a filter, and then selects the appropriate network protocol to process the packet. When no filters match, a default routing protocol 122 or MAC protocol 121 is chosen. As is indicated by arrow 158, the selected protocol is activated to process the packet.

As an example, a voice routing protocol may add the filter "QoS label >5" to node 101. All packets that require high QoS guarantees will then be routed using this specialized protocol. As another example, a routing protocol that implements an efficient broadcast algorithm may registers itself in node 101 using the filter "address==BROADCAST ADDR.

Plug-in of protocols rather than statically wiring them has several advantages. Since many applications have diverse network requirements, the architecture of node 100 is able to dynamically change between different routing or MAC protocols at runtime. The optimal protocol is selected by the node 101 based on the network context and/or the packet type. Further, run-time insertion or upgrading of protocols is supported. Backwards compatibility is guaranteed since legacy systems can be supported as will be explained below.

In summary, the information driven approach that is illustrated by the architecture of node 100 in FIG. 1 has substantial advantages. By using the packet facade 134 for packet interactions, protocol logic is decoupled from packet representation. Rather than statically wiring the protocols, protocols are dynamically selected based on protocol-provided filters. A shared, system-wide packet queue 112 reduces the overall memory footprint and enables to enforce system-wide QoS. Heterogeneity is promoted since protocols can be added to a node according to its capabilities. At last, by efficiently combining the information exchanges through packet aggregation, the number of transmitted packets 162 will be reduced significantly.

It is noticed that the approach described here above in relation to the embodiment illustrated by FIG. 1 can be broadened so that all types of information exchanges are aggregated. Many information exchanges between nodes are not very time sensitive, such as the exchange of status information, reporting remaining energy, or transfer of low-priority routing information. As such, it is reasonable to assume that some of these packets can be delayed for a short amount of time before being sent. When a protocol requests the sending of a parameter, the protocol preferably should also give an indication of the time-sensitivity of the parameter. This indicated time-sensitivity can be used by the packet creation function.

A node 101 operating according to the current invention collects the information parameters in the waiting space of a central repository 133. Delay tolerant parameters can stay in the waiting space for up to a per-parameter predefined period of time. Whenever a packet is relayed through the node 101, all information parameters to the same next hop or destination are added to the packet. If no data have been relayed within the allowed waiting time, the node 101 generates a new packet which combines all parameters that have the same destination.

Figure 3:
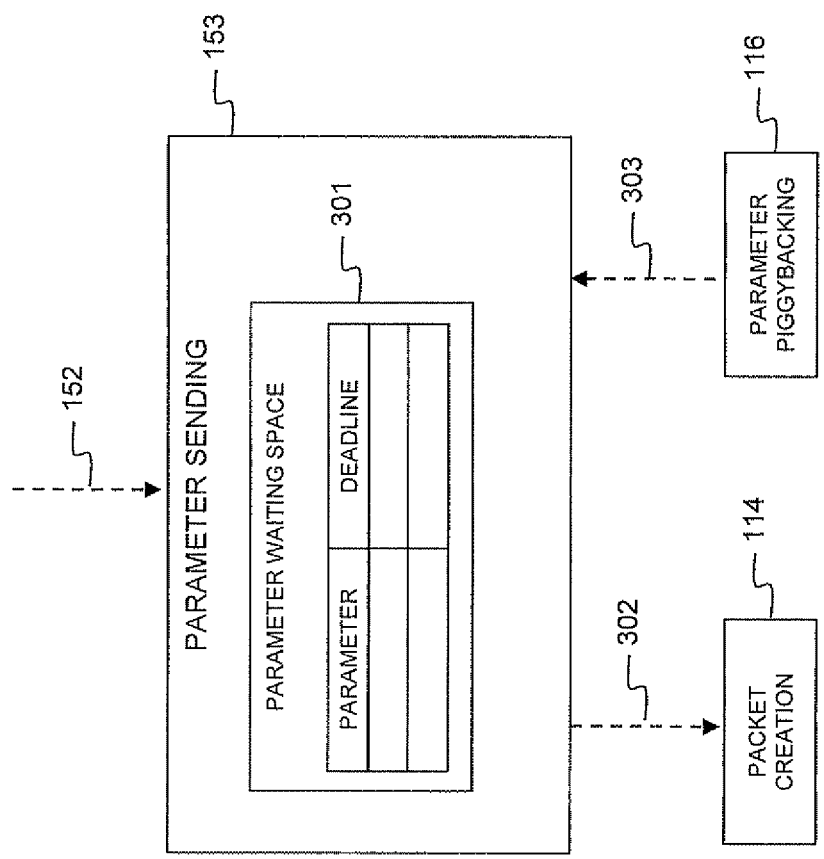
FIG. 3 illustrates operation of a parameter waiting space in the embodiment of FIG. 1.

The concept of a waiting space 301 wherein information parameters and the allowed waiting time or deadline are stored, is further illustrated by FIG. 3. As is indicated by arrow 302, the packet creation function 114 adds a parameter with expiring deadline from the parameter waiting space 301 to a newly generated packet. The parameter piggybacking function 116 requests the parameter sending module 153 which parameters have a similar destination attribute and/or which parameters have a similar next hop attribute. This is indicated by arrow 303. The parameters with the same destination or same next hop are then added to the packet by the packet creation function 114.

As already mentioned here above, the information driven architecture illustrated by FIG. 1 is very suited to support architectural quality of service. Through the packet facade 134, the node 101 can request the QoS attributes of any relayed packet. Since all packets are stored in a shared packet queue 112, the node 101 can monitor all available packets. This gives the node 101 a clear view on the expected delay of the packet. QoS can be supported by giving precedence to packets with a higher QoS level, or by intelligently dropping non-priority packets. To fulfill QoS requirements, a QoS protocol can put the processing of low-priority packets on hold, even when those packets are currently being processed by a protocol. Finally, the architecture of node 100 supports multiple protocols such that packets which require strict QoS guarantees can be processed by specialized protocols.

Applications such as process and asset monitoring, disaster intervention and wireless building automation, require special devices, called actuators, which can interact with the environment. Future sensor networks are therefore expected to consist of nodes with strongly diverging capabilities.

Using the information driven architecture of node 100 illustrated by FIG. 1, information attributes remain associated with a packet, whether or not the protocol that added them is executed. Thus, the node 101 can choose to omit non essential protocols from sensor nodes with limited capabilities. The node 101 can also choose to execute different, simple protocols on lightweight nodes. These protocols can add their own attributes or reuse the control parameters that were added by previous protocols. This flexibility ensures that the architecture of node 100 is suitable for both high capacity and low capacity nodes in the network.

The information driven architecture of node 100 in FIG. 1 allows legacy nodes and new nodes to communicate directly, by supporting legacy packet types and a legacy MAC protocol. Legacy packets can be supported transparently for the new protocols by providing the corresponding packet implementation. This implementation stores the relevant control parameters at the expected header locations of the legacy packets. Thus, the packet that is created by the packet facade is undistinguishable from packets created by traditional OSI network stacks. The legacy MAC protocol can be ported to the new architecture of node 100. By registering it as the optimal MAC protocol for neighboring legacy nodes, the protocol selector 113 will always select the correct MAC protocol to process and send packets.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A node configured to generate or receive, process and transmit information packets in a network with embedded devices using at least one of heterogeneous data formats and protocols at different network layers, the node comprising:
a protocol selector component configured to plug-in and select a protocol, the protocol selector component comprising memory for storage of protocol rules that specify when the protocol can be used, the protocol selector component being further configured to:
count for each protocol in the memory an amount of the protocol rules that is satisfied by the packet; and
select the one or more protocols for processing the packet as the one or more protocols with highest amount of satisfied protocol rules;
for each information packet, the node is configured to dynamically determine and select one or more of a plurality of protocols for processing the packet in the node based on protocol rules that specify when a protocol can be used, and activate at runtime the one or more selected protocols for processing the packet; and wherein at least two different protocols of the plurality of protocols are selectable and activateable by the node for processing two different packets for the same network layer.

2. The node according to claim 1, comprising: an information interaction specification module configured to specify the interaction with said generated or received information packets.

3. The node according to claim 2, wherein said information interaction specification module comprises an information facade containing information descriptors for each type of information packet, said information facade being configured to interpret content of said generated or received information packets based on said information descriptors.

4. The node according to claim 3, wherein said information facade is further configured to generate a protocol independent information container.

5. The node according to claim 4, wherein said protocol independent information container contains generated or received information of plural protocols and/or network layers having the same destination or next hop information attribute.

6. The node according to claim 1, further comprising: a single queue for protocol independent storage of said generated or received information packets.

7. The node according to claim 6, further comprising: a queue manager that is arranged to handle information stored in said queue based on quality of service.

8. The node according to claim 4, further comprising: an information container converter configured to convert an information container thereby removing overhead of at least one of plural protocols and layers from said information container thereto using said information descriptors.

9. The node according to claim 1, wherein the node is configured to associate plural communication interfaces of said node with a single Medium Access Control or MAC protocol.

10. A wireless sensor network comprising one or more nodes as recited in claim 1.

11. A computer-implemented method to generate or receive, process and transmit information packets in a node, comprising the steps of:
plugging-in and selecting a protocol by a protocol selector;
determining by the protocol selector when a protocol is usable based on protocol rules stored in a memory of the protocol selector; and
for each packet:
dynamically determining and selecting by the node one or more of a plurality of protocols for processing the packet in the node based on protocol rules that specify when a protocol can be used, comprising:
counting by the protocol selector for each protocol in the memory an amount of the protocol rules that is satisfied by the packet; and
selecting by the protocol selector the one or more protocols for processing the packet as the one or more protocols with highest amount of satisfied protocol rules; and
activating by the node at runtime the one or more selected protocols for processing the packet,
wherein the node is in a network with embedded devices using at least one of heterogeneous data formats and protocols at different network layers, and wherein at least two different protocols of the plurality of protocols are selectable and activateable by the node for processing two different packets for the same network layer.

12. The computer-implemented method according to claim 11, further comprising: specifying by an information interaction specification module interaction with each of said generated or received information packets.

13. The computer-implemented method according to claim 12, further comprising: interpreting by an information facade of the information interaction specification module content of said generated or received information packets based on information descriptors for each type of information.

14. The computer-implemented method according to claim 13, further comprising: generating by said information facade a protocol independent information container.

15. The computer-implemented method according to claim 14, wherein said protocol independent information container contains generated or received information of plural protocols and/or network layers having the same destination or next hop information attribute.

16. The computer-implemented method according to claim 11, further comprising: storing the generated or received information of the packets independently of the protocol in a single queue.

17. The computer-implemented method according to claim 16, wherein a queue manager handles the information stored in the single queue based on quality of service.

18. The computer-implemented method according to claim 14, further comprising: converting an information container by an information container converter by removing overhead of at least one of plural protocols and layers from said information container using said information descriptors.

19. The computer-implemented method according to claim 11, further comprising: associating by the node plural communication interfaces of said node with a single Medium Access Control or MAC protocol.

20. The computer-implemented method according to claim 11, wherein the node selects the one or more protocols for each packet based on protocol rules by checking if the packet has an attribute matching a filter added by a protocol during protocol registration.

21. A computer-implemented method to generate or receive, process and transmit information in a node, comprising:
dynamically determining and selecting by the node one or more protocols for processing generated or received information in the node based on protocol rules that specify when a protocol can be used, comprising:
counting for each protocol an amount of said protocol rules that is satisfied by said generated or received information; and
selecting the one or more protocols with highest amount of satisfied protocol rules as said one or more protocols for processing said generated or received information; and
activating by the node at runtime the one or more selected protocols for processing said generated or received information;
wherein the node is in a network with embedded devices using at least one of heterogeneous data formats and protocols at different network layers.

* * * * *